United States Patent Office 3,737,442
Patented June 5, 1973

---

3,737,442
THIO-ETHER DERIVATIVES OF 3,7,11-TRIMETHYLDODECA-2,4-DIENOATES USEFUL IN THE CONTROL OF INSECTS
John W. Baum, Palo Alto, Calif., assignor to Zoecon Corporation, Palo Alto, Calif.
No Drawing. Continuation-in-part of application Ser. No. 170,387, Aug. 9, 1971. This application Nov. 11, 1971, Ser. No. 197,952
Int. Cl. C08h *3/00, 9/02*
U.S. Cl. 260—399
10 Claims

ABSTRACT OF THE DISCLOSURE

Novel thia compounds of Formula A which includes di-unsaturated acids, esters and derivatives thereof, intermediates therefor, which are useful for the control of insects.

---

This is a continuation-in-part of U.S. application Ser. No. 170,387, filed Aug. 9, 1971, the disclosure of which is incorporated by reference.

This invention relates to novel thia compounds of Formula A, intermediates therefor, preparation thereof and the control of insects. More particularly, the novel thia compounds of Formula A are represented by the following formula:

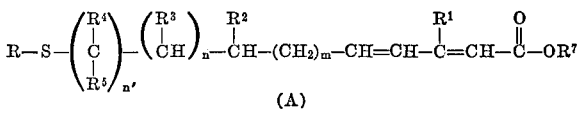

(A)

wherein:

$m$ is zero, one or two;
$n$ is zero to four;
$n'$ is zero or one;
R is alkyl, aryl, aralkyl or cycloalkyl;
each of $R^1$ and $R^2$ is lower alkyl;
each of $R^3$, $R^4$ and $R^5$ is hydrogen or lower alkyl; and
$R^7$ is hydrogen, lower alkyl, cycloalkyl, aryl, aralkyl or a metal cation, and the acid halides thereof.

The novel compounds of Formula A are useful for the control of insects. They are generally applied to the immature insect, namely—during the embryo, larvae or pupae stage. These compounds are effective control agents for Hemipteran, such as Lygaeidae, Miridae and Pyrrhocoridae; Coleopteran, such as Tenebrionidae; Lepidopteran, such as Pyralidae, Noctuidae and Gelechiidae; Dipteran, such as mosquitoes; Orthoptera, such as roaches; and Homoptera, such as aphids. The compounds can be applied at low dosage levels of the order of 0.1 µg. to 25 µg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants, emulsifying agents and wetting agents to assist in the application and efficiency of the active ingredient.

The compounds of the present invention of Formula A can be prepared according to the following outlined synthesis wherein $R'$ is lower alkyl, cycloalkyl, benzyl or phenyl; $R^6$ is lower alkoxy, cycloalkoxy or aralkoxy and W represents the moiety:

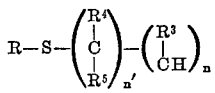

Hereinafter, each of $m$, $n$, $n'$, $R'$, $R-R^7$ and W is as defined above unless otherwise specified.

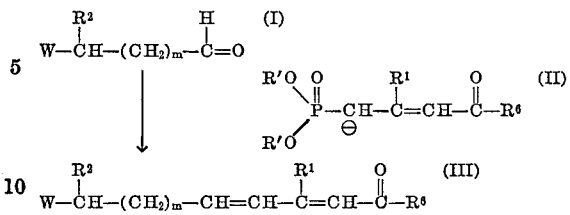

In the practice of the above synthesis, an aldehyde of Formula I is reacted with a carbanion of Formula II to prepare a dienoic ester of Formula III. The carbanion is generated from the respective phosphonate with a base such as alkali hydroxide, alkali alkoxide, alkali hydride, and the like. Suitable procedures are described by Pattenden and Weedon, J. Chem. Soc. (C), 1984 and 1997 (1968), Corey et al., Tetrahedron Letters, No. 2, 1821 (1971) and U.S. Pats. 3,163,669 and 3,177,226.

A second synthesis of esters of Formula III is outlined as follows:

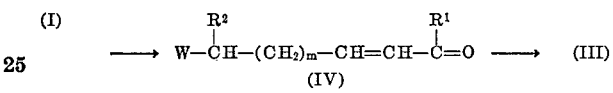

In the second synthesis outlined above of (I) to (IV) to (III), an aldehyde of Formula I is reacted with a carbanion of Formula IV-A using the conditions described above or with an ylid of Formula IV-B to yield an unsaturated ketone of Formula IV.

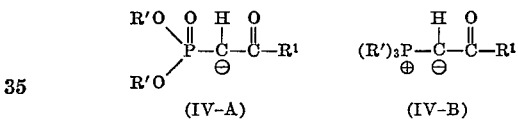

The unsaturated ketone (IV) is then reacted with a carbanion of Formula IV-C to yield a compound of Formula III or by Wittig reaction using the ylid (IV-D).

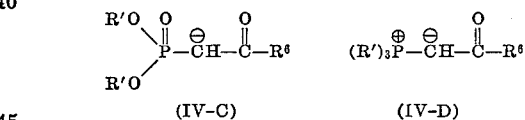

Conversion of (IV) into (III) using carbanion (IV-C) can be done using the same conditions as for conversion of (I) into (III). Wittig reactions are generally done at higher temperatures, such as from room temperature to reflux. The ylids are prepared from the corresponding phosphonium bromide or chloride by treatment with a base substance, such as an alkali metal hydride, alkali metal hydroxide or alkali metal carbonate in an organic solvent, such as toluene, benzene or tetrahydrofuran, or water or aqueous organic solvent depending upon the particular base. The Wittig reagents can be prepared as described in U.S. Pat. 3,193,565.

The esters of Formula III are converted into the corresponding acid by hydrolysis with base, such as potassium carbonate, sodium carbonate, or sodium hydroxide in aqueous organic solvent, such as methanol or ethanol. Other esters of the present invention can be prepared by transesterification or conversion of the acid into the acid halide by treatment with thionyl chloride oxalyl chloride, phosphorus pentabromide, or the like, and then reacting the acid halide with the alcohol corresponding to the ester moiety desired.

In another embodiment of the present invention, there is provided thio-acids and thiol esters of Formula V. Thio-acids and thiol esters can be prepared from the respective acid halide using hydrogen sulfide to prepare the thio-acid and a thiol $R^{15}$—SH or a mercaptide to prepare the thiol ester. Thiol esters can be prepared by alkylation of the sodium salt of a thio-acid of the present invention also. See U.S. Pats. 3,567,747 and 3,505,366.

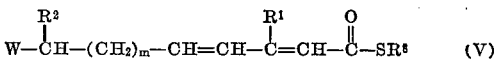

wherein, $R^8$ is hydrogen, lower alkyl, cycloalkyl, aryl or aralkyl.

In another embodiment of the present invention, there is provided ketones and aldehydes of Formula VI. The ketones can be prepared by treatment of an ester (III) or an acid thereof with the appropriate organo-lithium, the organo group corresponding to the ketone moiety desired. The reaction is generally carried out in an organic solvent, such as an ether solvent. In addition, acid halides, particularly the acid chloride, can be used for the preparation of ketones of Formula VI by reaction with lithium di-organocopper, e.g. lithium dimethylcopper, using the procedure of Posner and Whitten, Tetrahedron Letters, No. 53, 4647 (1970).

The aldehydes of Formula VI ($R^8$ is hydrogen) can be prepared by the controlled oxidation of an allylic alcohol of Formula VII ($R^9$ is hydrogen) using chromic acid, manganese dioxide, and the like. The oxidation can be carried out using procedures described by Burrell et al., J. Chem. Soc. (C), 2144 (1966); Weedon et al., J. Chem. Soc., 2687 (1951) and Helv. Chim. Acta. 32 1356 (1949). The allylic alcohols of Formula VII are prepared by reduction of the corresponding ester or acid of Formula A using lithium aluminum hydride, or the like.

$$W-\overset{R^2}{\underset{|}{C}H}-(CH_2)_m-CH=CH-\overset{R^1}{\underset{|}{C}}=CH-\overset{O}{\overset{\|}{C}}-R^8 \qquad (VI)$$

Ethers of Formula VII, i.e. wherein $R^9$ is not hydrogen, are prepared by etherification of an allylic alcohol of Formula VII using conventional etherification methods, such as by first converting the allylic alcohol into the corresponding halide of Formula VIII in which X is bromo, chloro or iodo, and then reacting the halide with the salt, e.g., the sodium or potassium salt, of an alcohol according to the ether moiety desired. The allylic halides serve as precursors for the preparation of the novel thiols and thio-ethers of Formula IX. Thus, reaction of a halide of Formula VIII with, for example, thiourea or hydrogen sulfide, provides the novel thiols. The thio-ethers can be prepared from the allylic halides by reaction with a mercaptide or by etherification of the thiol.

$$W-\overset{R^2}{\underset{|}{C}H}-(CH_2)_m-CH=CH-\overset{R^1}{\underset{|}{C}}=CH-CH_2-OR^9 \qquad (VII)$$

$$W-\overset{R^2}{\underset{|}{C}H}-(CH_2)_m-CH=CH-\overset{R^1}{\underset{|}{C}}=CH-CH_2-X \qquad (VIII)$$

$$W-\overset{R^2}{\underset{|}{C}H}-(CH_2)_m-CH=CH-\overset{R^1}{\underset{|}{C}}=CH-CH_2-SR^9 \qquad (IX)$$

In the above formulas, $R^9$ is hydrogen, lower alkyl, cycloalkyl, aryl, aralkyl or carboxylic acyl.

In another embodiment of the present invention, there is provided novel amines of Formula X which are prepared by reaction of an allylic halide of Formula VIII with an amine according to the amino moiety desired.

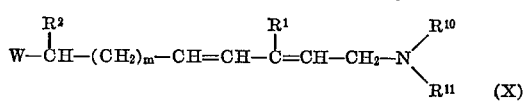

wherein, each of $R^{10}$ and $R^{11}$ is hydrogen, alkyl, alkenyl, cycloalkyl, hydroxyalkyl, alkoxyalkyl, aryl or aralkyl, or when taken together with the nitrogen atom to which they are attached, pyrrolidino, morpholino, piperazino or 4-alkylpiperazino.

In another embodiment of the present invention, there is provided nitriles of Formula XI which can be prepared by reaction of a carbonyl of Formula IV with a phosphonacetonitrile of the formula:

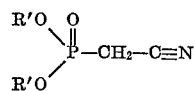

in the presence of base, such as an alkali metal hydride or alkali metal alkoxide, in an organic solvent, such as tetrahydrofuran, benzene, dimethylsulfoxide, toluene, dimethylformamide, ether, and the like. The nitriles of the present invention can be prepared also by treatment of a primary amide of the present invention with sodium borohydride using the procedure of Ellzey, Jr. et al., U.S. Pat. 3,493,576. The nitriles of Formula XI can be used as precursors for preparation of the amines of the present invention as by treatment with lithium aluminum hydride, and the like, to the respective primary amine.

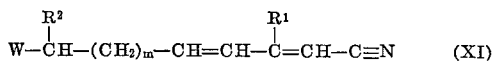

In another embodiment of the present invention, there is provided novel amides of Formula XII:

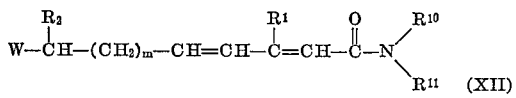

which can be prepared by reaction of an acid chloride or acid bromide of Formula A with an appropriate amine selected according to the amido moiety desired. The novel amides of the present invention can be prepared also by the reaction of a carbonyl of Formula I with a carbanion of the formula:

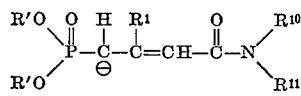

which is generated by treatment of the corresponding phosphonamide with base, such as alkali metal hydride or alkali metal alkoxide. The amides can be prepared also by reaction of a carbonyl of Formula IV with a carbanion or yield of the following formulas, respectively:

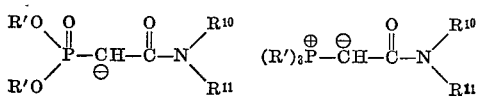

The novel compounds of Formulas V, VI, VII, IX, X, XI and XII are useful for the control of insects in the same manner as the parent compounds of Formula A.

The thio-ethers described herein are useful precursors for preparing the respective sulfinyl and sulfonyl derivatives by treatment of the thio-ether with sodium metaperiodate, hydrogen peroxide, or the like, at a temperature of from about 0° to 20° C. for about one hour or less to about six hours to prepare sulfinyl derivatives. The reaction usually affords some of the sulfonyl compound also which can be separated by chromatography, or the like, if desired. By using more than one mole of oxidizer per mole of thio-ether, higher temperature and/or longer reaction time, the formation of the sulfonyl compounds is favored. The sulfinyl and sulfonyl derivatives are useful for the control of insects in the same manner as the thio-ethers of Formula A.

The term "cycloalkyl," as used herein, refers to a cyclic alkyl group of four to eight carbon atoms. The term "aralkyl" refers to a monovalent hydrocarbon group in which an aryl group is substituted for a hydrogen atom of an alkyl group such as benzyl, xylyl, mesityl, phenylethyl, methylbenzyl, naphthylmethyl and naphthylethyl containing up to twelve carbon atoms. The term "aryl," as used herein, refers to an aromatic group of up to twelve carbon atoms. Typical aromatic groups include phenyl, naphthyl, lower alkylphenyl, such as methylphenyl, ethylphenyl, t-butylphenyl and isopropylphenyl, lower alkylthiophenyl, such as methylthiophenyl, ethylthiophenyl and isopropylphenyl, such as methylthiophenyl, ethylthiopenyl and isopropylthiophenyl, lower alkoxyphenyl, such as methoxyphenyl and ethoxyphenyl, halophenyl, such as chlorophenyl, bromophenyl, iodophenyl and fluorophenyl, nitrophenyl, methylenedioxyphenyl, lower alkenylphenyl, such as vinylphenyl and allylphenyl, phenylketones, such as acetophenone, benzoic esters, such as lower alkylbenzoate and benzamides, such as N-lower alkylbenzamide, and N, N-di(lower alkyl)benzamide. In the case of substituted phenyl, the substituents such as lower alkyl, lower alkylthio, lower alkoxy, halo, nitro, lower alkenyl, carbonyl, lower alkoxycarbonyl, cyano and amido can be in one or more positions of the phenyl ring, usually in the para position.

The term "hydroxyalkyl," as used herein, refers to an alkyl group substituted with one hydroxy group, e.g., hydroxymethyl, p-hydroxyethyl and 4-hydroxypentyl. The term "alkoxyalkyl," as used herein, refers to an alkyl group substituted with one alkoxy group, e.g., methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g., allyl, vinyl, 3-butenyl, 2-hexenyl and i-propenyl. Whenever any of the foregoing terms are modified by the word "lower," the chain length of the group is not more than six carbon atoms with the exception of lower alkoxyalkyl, in which event a total chain length of twelve carbon atoms is the maximum.

The term "carboxylic acyl," as used herein, refers to the acyl group of a carboxylic acid, anhydride or halide. The acyl group is determined by the particular carboxylic acid halide or carboxylic acid anhydride employed in the esterification. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The term "metal," as used herein, refers to lithium, sodium, potassium, calcium, strontium, copper, manganese and zinc. The term "alkyl" refers to a branched or straight chain, saturated aliphatic hydrocarbon of one to twelve carbon atoms. The term "lower alkyl" refers to an alkyl group having a chain length of one to six carbon atoms.

In addition to the compounds of the present invention having activity useful for the control of insects, the compounds have numerous other useful applications. For example, the esters of Formula A of the present invention are useful lubricants and plasticizers for polymers, such as SBR, polybutadiene, ethylene-propylene copolymers and polypropylene and aid in the processing and application of polymers. The aldehydes and ketones of Formulas IV and VI are useful in prefumery compositions in view of their odor-imparting properties. Thiol esters of Formula V possess excellent lubricating properties per se and are useful also as lubricant additives. The amides of Formula XII are useful anti-static agents for synthetic and natural fibers. The amides can be incorporated into the fiber material by blending prior to extrusion or by application to the fiber after extrusion. The amides of Formula X are useful wetting and cleansing agents per se for textiles and as intermediates therefor using the method of U.S. Pat. 2,169,976.

The presence of an olefinic bond at position C-2 and C-4 of the compounds of the present invention give rise to four isomers, each of which is embraced by the present invention. As mentioned above, a mixture of isomers is suitably employed for the control of insects, such as a mixture containing the trans(2),trans(4) isomer and the cis(2),trans(4) isomer. The conditions of the syntheses described herein and the reactants can be selected so as to favor formation of one isomer, such as the all trans isomer over the formation of other isomers. The selection of appropriate conditions and reactants to favor formation of one isomer over another will be apparent to those of ordinary skill in the art giving due consideration to the specific examples hereinafter. See also Patenden and Weedon, supra and Corey et al., supra. In the specific examples hereinafter, when isomerism is not specified, it is understood to include a mixture of isomers which, if desired, can be separated using known separation methods. Hereafter, when only one designation of configuration is given, the designation refers to position C-2,3 and the configuration is taken to be trans at position C-4,5 when not otherwise specified.

Synthesis of the aldehydes (I) can be accomplished according to the method of application Ser. No. 170,387, filed Aug. 19, 1971. For other preparations of the aldehydes and ketones, see U.S. Pats. 2,492,334; 3,098,078; 2,745,-745; 3,356,566 and 3,419,617 and Cain and Cunneen, J. Chem. Soc., 2959 (1962).

The following examples are provided to illustrate the practice of the present invention. Temperature is given in degrees centigrade.

EXAMPLE 1

Sodium methoxide (1.2 g. of sodium and 30 ml. of methanol) is added slowly to a mixture of 6.4 g. of 6-thia-3,7-dimethyloctan-1-al and 10.0 g. of diethyl 3-methoxycarbonyl-2-methylprop-2-enyl-phosphonate in 50 ml. of dimethylformamide, under nitrogen and at about 0°, with stirring. After addition is complete, the reaction is left 3 hours at room temperature and worked up by extraction with hexane/ether to yield methyl 10-thia-3,7, 11-trimethyldodeca-2,4-dienoate.

EXAMPLE 2

Sodium ethoxide (9 g. sodium in 600 ml. of ethanol) is added slowly to a mixture of 54.0 g. of 6-thia-3,7-dimethyloctan-1-al and 75.0 g. of diethyl 3-ethoxycarbonyl-2-methylprop-2-enyl phosphonate in one liter of dimethylformamide, under nitrogen at 0° with stirring. The mixture is allowed to stand overnight at about 5° and the reaction worked up by extraction with ether and washing with water and brine to give ethyl 10-thia-3,7,11-trimethyldodeca-2,4-dienoate.

EXAMPLE 3

Sodium ethoxide (0.2 g. of sodium and 12 ml. of ethanol) is added slowly to a mixture of 1.1 g. of 6-thia-3,7-dimethylnonan-1-al, 1.6 g. of diethyl 3-ethoxycarbonyl-2-methylprop-2-enyl phosphonate and 50 ml. of dimethylformamide, with stirring, under nitrogen, at 0°. The reaction is stirred for 1.5 hours after addition is complete and then worked up by extraction with ether to yield ethyl 10-thia-3,7,11-trimethyltrideca-2,4-dienoate.

EXAMPLE 4

To a mixture of 10.0 g. of 6-thia 3,7-dimethyloctan-1-al, 17.0 g. of diethyl 3-ethoxycarbonyl-2-methylprop-2-enyl phosphonate and 150 ml. of dimethylformamide, under nitrogen, 0°, with stirring, is added sodium isopropanolate (prepared from 1.5 g. of sodium and 150 ml. of isopropanol). After addition is complete, the reaction is stirred for 18 hours at room temperature and then worked up by extraction with hexane to give isopropyl 10-thia-3,7-11-trimethyldodeca-2,4-dienoate which can be purified by chromatography and distillation.

EXAMPLE 5

A mixture of 5.0 g. of 5-thia-3,6-dimethylheptan-1-al and 8.5 g. of diisopropyl 3-ethoxycarbonyl-2-methylprop-2-enyl phosphonate and 40 ml. of dimethylformamide, under nitrogen and cooled in an ice-bath, is stirred for 0.5 hour and then 1.2 g. of ground sodium hydroxide is added. The reaction mixture is stirred at room temperature for 3 hours and then hexane/water (1/1) is added. The organic phase is washed with water and brine, dried over calcium sulfate and concentrated. The concentrate is taken up in hexane and then fractionally distilled to give crude ethyl 9-thia-3,7,10-trimethylundeca-2,4 - dienoate which is purified by chromatography.

EXAMPLE 6

To 350 ml. of ethanol, 105 ml. of water and 70 ml. of 50% aqueous sodium hydroxide is added 46.5 g. of methyl 10-thia-3,7,11-trimethyldodeca-2,4-dienoate. The mixture is refluxed for about 18 hours. After cooling, alcohol is removed in vacuo. Water is added followed by slight acidification and then extraction with ether to yield 10-thia-3,7,11-trimethyldodeca-2,4-dienoic acid.

EXAMPLE 7

To 0.6 g. of 10-thia-3,7,11-trimethyldodeca-2,4-dienoic acid in 10 ml. of dry benzene is added 0.23 ml. of oxalyl chloride at room temperature with stirring. After two hours, isopropanol (2 ml.) is added and the mixture allowed to stand at room temperature for about two hours. Ether and saturated sodium bicarbonate is added and the organic phase separated. The organic phase is washed with aqueous sodium bicarbonate, saturated sodium chloride, dried over calcium sulfate and evaporated to yield isopropyl 10 - thia - 3,7,11 - trimethyldodeca-2,4-dienoate.

EXAMPLE 8

To 0.6 g. of 10-thia-3,7,11-trimethyldodeca-2,4-dienoic acid in 10 ml. of dry benzene is added 0.23 ml. of oxalyl chloride at room temperature. After about two hours, there is added 0.25 ml. of 3-thiabutan-1-ol and the reaction allowed to stand for about two hours. The reaction is worked up as in Example 7 to yield 3'-thiabutanyl-10-thia-3,7,11-trimethyl-dodeca-2,4-dienoate.

EXAMPLE 9

To a solution of 0.5 g. of 10-thia-3,7,11-trimethyldodeca-2,4-dienoic acid in 15 ml. of benzene is added, with stirring, an equivalent amount of potassium hydride. The mixture is stirred at room temperature for about 2 hours and then evaporated to give potassium 10-thia-3,7,11-trimethyldodeca-2,4-dienoate.

In place of KH, there can be used KOH, NaOH, and the like to form the corresponding salt.

EXAMPLE 10

To a solution of 2 g. of methyl 10-thia-3,7,11-trimethyl-dodeca-2,4,10-trienoate and 20 ml. of dry ether, at −78° is added slowly about 0.4 g. of lithium aluminum hydride in dry ether. The mixture is allowed to stand about one hour after addition is complete and then allowed to warm up to room temperature. Then 2.5 ml. of acetic acid is added. The mixture is then washed with ice water and the organic phase separated which is dried over magnesiuum sulfate and evaporated to yield 10-thia-3,7,11-trimethyldodeca-2,4-dien-1-ol.

EXAMPLE 11

A mixture of 0.18 g. of NaH (rinsed with hexane), 5 ml. of tetrahydrofuran and 0.8 g. of diethyl diethylaminocarbonylmethyl phosphonate, under nitrogen, is stirred 0.5 hours at 0°. To the mixture is slowly added 1.0 g. of 9-thia-6,10-dimethylundec-3 - en - 2 - one. After addition is complete, the reaction is left at room temperature for about 60 minutes and then chromatographed on silica with ether to yield N,N-diethyl 10-thia-3,7,11-trimethyldodeca-2,4-dienamide (mostly trans-2-trans-4), which can be further purified by chromatography.

EXAMPLE 12

To sodium hydride (0.7 g.), previously washed with hexane, under nitrogen, is added 75 ml. of dry tetrahydrofuran and then, after cooling to 0°, 5.1 g. of diethyl phosphonacetronitrile is added slowly. The mixture is stirred for about 30 minutes and then added slowly to 6.8 g. of 9-thia-6,10-dimethylundeca-3-en-2-one at room temperature with stirring. The mixture is stirred for about 12 hours and then poured into saturated sodium chloride at 0°. The layers are separated and the organic layer dried over magnesium sulfate and evaporated to yield 10-thia-3,7,11-trimethyldodeca-2,4-dienenitrile.

EXAMPLE 13

To a stirred solution of 2.5 g. of 10-thia-3,7,11-trimethyldodeca-2,4-dienoic acid in 20 ml. of dry ether is added slowly at 0°, 23 ml. of a one molar solution of ethyl lithium in benzene. After about three hours at 20°, the mixture is poured into iced 1 N hydrochloric acid (100 ml.) with vigorous stirring. The ether layer is separated, combined with ethereal washings of the aqueous phase, washed with water, saturated potassium bicarbonate and then saturated brine, dried over magnesium sulfate and concentrated under reduced pressure to yield 12-thia-5,9,13-trimethyltetradeca-4,6-dien-3-one, which can be purified by chromatography.

By using methyl lithium, cyclopentyl lithium and phenyl lithium in the above process in place of ethyl lithium, there is prepared 11-thia-4,8,12-trimethyltrideca-3,5-diene-2-one, cyclopentyl 9-thia 2,6,10-trimethylundeca-1,3-dienyl ketone and phenyl 9-thia-2,6,10-trimethylundeca-1,3-dienyl ketone, respectively.

EXAMPLE 14

To 0.55 g. of 10-thia-3,7,11-trimethyldodeca-2,4-dienoic acid in 10 ml. of dry benzene is added 0.21 ml. of oxalyl chloride. The mixture is stirred occasionally at room temperature for about 2.5 hours. The mixture is cooled in cold water and then 0.18 ml. of ethylmercaptan is added with stirring. The mixture is then stirred at room temperature for about 24 hours. Ether and saturated sodium bicarbonate is added and the organic phase separated. The organic phase is washed with aqueous sodium bicarbonate, saturated sodium chloride, dried over calcium sulfate and evaporated to yield ethyl 10-thia-3,7,11-trimethyl-thioldodeca-2,4-dienoate.

Thiol esters are prepared using each of n-propyl mercaptan isopropyl mercaptan, isobutyl mercaptan, s-butyl mercaptan, n-butyl mercaptan, benzyl mercaptan, cyclopentyl mercaptan β-phenylethyl mercaptan, t-amyl mercaptan and n-hexyl mercaptan in reaction with 10-thia-3,7,11-trimethyldodeca-2,4-dienoyl chloride or the sodium salt of 10-thia-3,7,11-trimethyldodeca-2,4-dienoic acid to yield n-propyl 10-thia 3,7,11-trimethyl-thioldodeca-2,4-dienoate, isopropyl 10-thia-3,7,11-trimethyl-thiododeca-2,4-dienoate, etc.

EXAMPLE 15

A mixture of 2 g. of 10-thia-3,7,11-trimethyldodeca-2,4-dien-1-ol, 1 equivalent of manganese dioxide and 30 ml. of methylene dichloride is prepared by the slow addition of manganese dioxide so that the temperature does not exceed about 30°. The mixture is then shaken for one hour, under nitrogen, at room temperature. The mixture is then filtered and the filter washed with ether. The filtrate and washings are combined and evaporated to yield 10-thia-3,7,11-trimethyldodeca-2,4-dien-1-al which is purified by chromatography.

EXAMPLE 16

To 126 mg. of a 57% dispersion of sodium hydride in oil is added pentane. The pentane is removed and the sodium hydride washed several times with pentane. To the washed sodium hydride is added 582 mg. of diethyl acetyl-methylphosphonate in 5 ml. of tetrahydrofuran at −10° under argon. After several minutes, the solution is transferred to a solution of 425 mg. of 6-thia-3,7-dimethylotan-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 9-thia-6,10-dimethylundec-3-en-2-one.

EXAMPLE 17

One gram of triphenylphineacetylmethylene and 425 mg. of 6-thia-3,7-dimethylnonan-1-al are dissolved in 10 ml. of toluene and refluxed under nitrogen overnight. The toluene is distilled off and the formed triphenylphosphine oxide crystallized by addition of pentane. Filtration and evaporation of the pentane gives a residue, which is further purified by perparative thin layer chromatography to yield 9-thia-6,10-dimethyldodec-3-en-2-one.

EXAMPLE 18

41 grams of 6-thia-3,7-dimethyloctan-1-al and 80 g. of recrystallized (ethyl acetate) triphenylphosphineacetylmethylene [Ramirez et al., J. Org. Chem. 22, 41 (1957)] are refluxed in one liter of dry toluene for 18 hours, under nitrogen. Most of the solvent is removed in vacuo, 500 ml. pentane is added and the mixture filtered. The flask and the triphenylphosphine oxide filter cake are washed several times with pentane. The filtrate is concentrated under vacuum to yield 9-thia-6,10-dimethyl-undec-3-en-2-one.

EXAMPLE 19

The carbanion of diethyl carbomethoxymethyl phosphonate is reacted with 9-thia-6,10-dimethylundec-3-en-2-one and 9-thia-6,10-dimethyldodec-3-en-2-one to prepare methyl 10-thia-3,7,11-trimethyldodeca-2,4-dienoate and methyl 10-thia-3,7,11-trimethyltrideca-2,4-dienoate.

EXAMPLE 20

A mixture of 9.0 g. of 6-thia-3,7-dimethyloctan-1-al and 15 g. of triphenylphosphineacetylmethylene in 100 ml. of dry toluene, under nitrogen, is refluxed for 20 hours. Thereafter, the toluene is evaporated and pentane added to remove triphenylphosphine. After concentration, the product is distilled to yield 9-thia-6,10-dimethylundec-3-en-2-one. The thus-prepared ketone is reacted with the carbanion of diethyl carbethoxymethylphosphonate to prepare ethyl 10-thia-3,7,11-trimethyldodeca-2,4-dienoate.

EXAMPLE 21

Two grams of 10 - thia - 3,7,11-trimethyltrideca-2,4-dienoic acid chloride is added to 50 ml. of benzene, cooled to 0° and saturated with ammonia under nitrogen. The mixture is allowed to stand for about one hour and then it is washed with water, dried over sodium sulfate and evaporated to yield 10-thia-3,7,11-trimethyltrideca-2-dienamide.

EXAMPLE 22

Three grams of 10 - thia - 3,7,11-trimethyldodeca-2,4-dienoyl chloride in benzene is mixed with 2.5 g. of diethylamine in benzene and the resulting mixture allowed to stand at room temperature for about two hours. The mixture is concentrated under reduced pressure and the residue taken up in benzene, washed with dilute aqueous sodium bicarbonate and water, dried over sodium sulfate and evapordated to yield N,N-diethyl 10-thia-3,7,11-trimethyldodeca-2,4-dienamide.

By use of the foregoing procedure, each of dimethylamine ethylamine, pyrrolidine, piperidine, aniline, morpholine, and 2-methoxyethylamine is reacted with the acid chloride to yield the corresponding amide, that is N,N-dimethyl 10-thia-3,7,11-trimethyldodeca-2,4-dienamide, N-ethyl 10-thia-3,7,11-trimethyldodeca-2,4-dienamide, etc.

EXAMPLE 23

Ten grams of 1-bromo-10-thia-3,7,11-trimethyldodeca-2,4-diene is mixed with 50 ml. of benzene, cooled to 5–10° and saturated with ammonia. The resulting mixture is stirred for four hours allowing the temperature to rise to about 20° while maintaining dry conditions. The mixture is washed with dilute sodium hydroxide and then evaporated under reduced pressure to yield 10-thia-3,7,11-trimethyldodeca-2,4-dienylamine.

EXAMPLE 24

Five grams of 10-thia-3,7,11-trimethyldodeca-2,4-dienylbromide in 25 ml. of benzene is mixed with 4 g. of diethylamine and the mixture stirred for about three hours. Methylene chloride (50 ml.) is added and the mixture washed with dilute sodium hydroxide and then water and evaporated to yield N,N-diethyl 10-thia-3,7,11-trimethyldodeca-2,4-dienylamine.

Other amines of the present invention are prepared by use of the foregoing procedure using an amine of the formula:

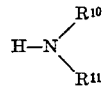

such as dimethylamine, ethylamine, methylamine, pyrrolidine, morpholine, 4-ethylpiperazine, and the like, in place of diethylamine. Thus, there is prepared N,N-dimethyl 10-thia-3,7,11-trimethyldodeca-2,3-dienylamine, N-ethyl 10-thia-3,7,11-trimethyldodeca-2,4-dienylamine, etc.

EXAMPLE 25

To one g. of 10-thia-3,7,11-trimethyldodeca-2,4-dien-1-ol in 20 ml. of dry ether is added one molar equivalent of diazoethane. One drop of boron-trifluoride is added and after one hour at 0° the mixture is washed with water and organic phase evaporated to yield the ethyl ether of 10-thia-3,7,11-trimethyldodeca-2,4-dien-1-ol.

The use of diazomethane in the foregoing procedure affords 1-methoxy 10-thia-3,7,11-trimethyldodeca-2,4-diene.

EXAMPLE 26

One g. of 10-thia-3,7,11-trimethyldodeca-2,4-dien-1-ol in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water, dried over sodium sulfate and evaporated to yield the cyclohexyl ether of 10-thia-3,7,11-trimethylodeca-2,4-dien-1-ol.

EXAMPLE 27

To a suspension of 1 g. of sodium hydride in 10 ml. of tetrahydrofuran, under argon, and cooled to 4°, is slowly added 4 g. of p-ethylphenol in 15 ml. of tetrahydrofuran. The mixture is stirred for about eight hours. To the mixture, cooled in an ice-bath, is slowly added 4 g. of 10-thia-3,7,11-trimethyldodeca-2,4-dienyl bromide in ether. After about two hours, the mixture is warmed to room temperature, 25 ml. of hexamethylphosphoramide is added and the mixture heated at 80° for about 48 hours. The mixture is then poured into water and extracted with ether. The ethereal extracts are combined, washed with dilute aqueous sodium hydroxide, water and brine, dried over sodium sulfate and then evaporated to yield 10-thia-3,7,11-trimethyldodeca-2,4-dienyl p-ethylphenyl ether.

EXAMPLE 28

One g. of 10-thia-3,7,11-trimethyldodeca-2,4-dien-1-ol in 10 ml. of dry pyridine is cooled to −10° and 2 ml. of acetic anhydride is added dropwise. The reaction is left about four hours at −10°. Then, ice water (about 5 ml.) is added dropwise. After about 0.5 hour, excess water is added and the mixture extracted with ether. The ethereal phase is washed with water, dried over calcium sulfate and solvent removed to yield 1-acetoxy-10-thia-3,7,11-trimethyldodeca-2,4-diene.

By using other carbonylic anhydrides in the process of this example in place of acetic anhydride, the respective C–1 esters are prepared.

EXAMPLE 29

To a solution of 3.01 g. of 6-thia-3,7-dimethyloctan-1-al in 50 ml. of dry dimethylformamide, under nitrogen, is added 4.60 g. of diethyl 3-ethoxycarbonyl-2-methylprop-2-enylphosphonate at 0°. After stirring 30 minutes, 0.425 g. of sodium in 10 ml. of ethanol is added over about 15 minutes. Stirring is continued for 3 hours and then the mixture poured into water (100 ml.) and extracted with ether/hexane. The extract is washed with water and brine, dried over calcium sulfate and evaporated to give crude ethyl 10-thia-3,7,11-trimethyldodeca-2,4-dienoate which is taken up in ether and purified by thin layer chromatography using ethyl acetate/hexane.

EXAMPLE 30

The carbanion of diisopropyl 3-ethoxycarbonyl-2-methylprop-2-enyl phosphonate is reacted with each of the aldehydes under Col. I to prepare the respective ethyl ester under Col. II

I 3,6-dimethyl-4-thiaheptan-1-al
4-thia-3,7-dimethyloctan-1-al
4-thia-3,6,6-trimethylheptan-1-al
4-thia-3,7,7-trimethyloctan-1-al
4-thia-3,5-dimethylhexan-1-al
5-thia-3,6-dimethylheptan-1-al
5-thia-3,6,6-trimethylheptan-1-al
5-thia-3,7-dimethyloctan-1-al
5-thia-3,7,7-trimethyloctan-1-al
6-thia-3,7,7-trimethyloctan-1-al
3-thia-2,5-dimethylhexan-1-al
3-thia-2,5,5-trimethylhexan-1-al
4-thia-2,5-dimethylhexan-1-al
3-thia-2,4-dimethylpentan-1-al

II ethyl 8-thia-3,7,10-trimethylundeca-2,4-dienoate
ethyl 8-thia-3,7,11-trimethyldodeca-2,4-dienoate
ethyl 8-thia-3,7,10,10-tetramethylundeca-2,4-dienoate
ethyl 8-thia-3,7,11,11-tetramethylodeca-2,4-dienoate
ethyl 8-thia-3,7,9-trimethyldeca-2,4-dienoate
ethyl 9-thia-3,7,10-trimethylundeca-2,4-dienoate
ethyl 9-thia-3,7,10,10-tetramethylundeca-2,4-dienoate
ethyl 9-ethia-3,7,11-trimethyldodeca-2,4-dienoate
ethyl 9-thia-3,7,11,11-tetramethyldodeca-2,4-dienoate
ethyl 10-thia-3,7,11,11-tetramethyldodcea-2,4-dienoate
ethyl 7-thia-3,6,9-trimethyldeca-2,4-dienoate
ethyl 7-thia-3,6,9,9-tetramethyldeca-2,4-dienoate
ethyl 8-thia-3,6,9-trimethyldeca-2,4-dienoate
ethyl 7-thia-3,6,8-trimethylnona-2,4-dienoate

EXAMPLE 31

Following the procedure of Example 16, 17 or 18, each of the aldehydes under Col. I is converted into the unsaturated ketone under Col. III of Formula IV.

III 7-thia-6,9-dimethyldec-3-en-2-one
7-thia-6,10-dimethylundec-3-en-2-one
7-thia-6,9,9-trimethyldec-3-en-2-one
7-thia-6,10,10-trimethylundec-3-en-2-one
7-thia-6,8-dimethylnon-3-en-2-one
8-thia-6,9-dimethyldec-3-en-2-one
8-thia-6,9,9-trimethyldec-3-en-2-one
8-thia-6,10-dimethylundec-3-en-2-one
8-thia-6,10,10-trimethylundec-3-en-2-one
9-thia-6,10,10-trimethylundec-3-en-2-one
6-thia-5,8-dimethylnon-3-en-2-one
6-thia-5,8,8-trimethylnon-3-en-2-one
7-thia-5,8-dimethylnon-3-en-2-one
6-thia-5,7-dimethyloct-3-en-2-one

EXAMPLE 32

Each of the aldehydes under Col. IV is reacted with the carbanion of diisopropyl 3-ethoxycarbonyl-2-methylprop-2-enylphosphonate to prepare the respective ethyl ester under Col. V.

IV 4-thia-3,6-dimethyloctan-1-al
4-thia-3,6,6-trimethyloctan-1-al
4-thia-3,5-dimethylheptan-1-al
5-thia-3,6-dimethyloctan-1-al
5-thia-3,6,6-trimethyloctan-1-al
3-thia-2,5-dimethylheptan-1-al
3-thia-2,5,5-trimethylheptan-1-al
4-thia-2,5-dimethylheptan-1-al
3-thia-2,4-dimethylheptan-1-al

V ethyl 8-thia-3,7,10-trimethyldodeca-2,4-dienoate
ethyl 8-thia-3,7,10,10-tetramethyldodeca-2,4-dienoate
ethyl 8-thia-3,7,9-trimethylundeca-2,4-dienoate
ethyl 9-thia-3,7,10-trimethyldodeca-2,4-dienoate
ethyl 9-thia-3,7,10,10-tetramethyldodeca-2,4-dienoate
ethyl 7-thia-3,6,9-trimethylundeca-2,4-dienoate
ethyl 7-thia-3,6,9,9-tetramethylundeca-2,4-dienoate
ethyl 8-thia-3,6,9-trimethylundeca-2,4-dienoate
ethyl 7-thia-3,6,8-trimethyldeca-2,4-dienoate

What is claimed is:

1. A compound selected from those of Formula A:

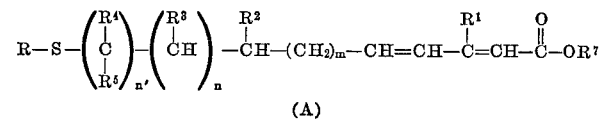

(A)

wherein:

$m$ is zero, one or two;
$n$ is zero to four;
$n'$ is zero or one;
R is alkyl, aryl, aralkyl or cycloalkyl;
each of $R^1$ and $R^2$ is lower alkyl;
each of $R^3$, $R^4$ and $R^5$ is hydrogen or lower alkyl; and
$R^7$ is hydrogen, lower alkyl, cycloalkyl, aryl, aralkyl or a metal cation, and the acid halides thereof.

2. A compound of claim 1 wherein $m$ is zero or one; $R^1$ is methyl; $R^2$ is methyl or ethyl; and each of $R^3$, $R^4$ and $R^5$ is hydrogen.

3. A compound of claim 2 wherein R is a branched primary alkyl group and $R^7$ is hydrogen or lower alkyl.

4. A compound of claim 3 wherein each of $n$ and $n'$ is zero and R is a branched primary alkyl group selected from the groups: 2-methylpropan-1-yl, 2-methylbutan-1-yl, 2-ethylbutan - 1 - yl, 3-methylbutan-1-yl, 3-methylpentan - 1 - yl, 3 - ethylpentan-1-yl, 2,2-dimethylpropan-1-yl, 2,2-dimethylbutan-1-yl, 3,3-dimethylbutan-1-yl and 3,3-dimethylpentan-1-yl.

5. A compound of claim 4 wherein $m$ is one and $R^7$ is lower alkyl of one to four carbon atoms.

6. A compound of claim 3 wherein $n'$ is zero and R is selected from the groups: isopropyl, butan-2-yl, pentan- 3-yl, 2-methylpropan-1-yl, 2-methylbutan-1-yl, 3-ethylbutan-1-yl, t-butyl, 2-methylbutan-2-yl, 2,2-dimethylpropan-1-yl and 2,2-dimethylbutan-1-yl.

7. A compound of claim 6 wherein $n$ is one.

8. A compound of claim 7 wherein $m$ is one and $R^7$ is lower alkyl of one to four carbon atoms.

9. A compound of claim 6 wherein $n$ is two.

10. A compound of claim 9 wherein $m$ is one and $R^7$ is lower alkyl of one to four carbon atoms.

References Cited

UNITED STATES PATENTS 3,697,561  10/1972  Henrick et al. ........ 260—399

ELBERT L. ROBERTS, Primary Examiner

U.S. Cl. X.R.

260—402, 468, 470, 479, 481, 514, 516, 526, 544